United States Patent
Kean

(10) Patent No.: US 11,533,447 B2
(45) Date of Patent: Dec. 20, 2022

(54) SINGLE-ENDED CAPACITIVE TRANS-IMPEDANCE AMPLIFIER (CTIA) UNIT CELL INCLUDING SHARED CLAMP CAPACITOR CIRCUIT FOR TWO-COLOR IMAGING

(71) Applicant: RAYTHEON COMPANY, Waltham, MA (US)

(72) Inventor: Bryan W. Kean, Denver, CO (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/214,745

(22) Filed: Mar. 26, 2021

(65) Prior Publication Data

US 2022/0311962 A1 Sep. 29, 2022

(51) Int. Cl.
| | |
|---|---|
| *H04N 5/378* | (2011.01) |
| *H04N 9/04* | (2006.01) |
| *H04N 5/363* | (2011.01) |
| *H04N 5/355* | (2011.01) |

(52) U.S. Cl.
CPC ............. *H04N 5/378* (2013.01); *H04N 5/355* (2013.01); *H04N 5/363* (2013.01); *H04N 9/04* (2013.01)

(58) Field of Classification Search
CPC ........ H04N 5/378; H04N 5/355; H04N 5/363; H04N 9/04
See application file for complete search history.

(56) References Cited

U.S. PATENT DOCUMENTS

| 6,704,046 B2 | 3/2004 | Dyas et al. | |
|---|---|---|---|
| RE43,085 E | 1/2012 | Lin et al. | |
| 2014/0016027 A1* | 1/2014 | Yang | H04N 5/3575 348/372 |
| 2014/0263972 A1* | 9/2014 | Chua | H01L 31/11 250/208.2 |

* cited by examiner

*Primary Examiner* — Nicholas G Giles
(74) *Attorney, Agent, or Firm* — Cantor Colburn LLP

(57) ABSTRACT

A capacitive trans-impedance amplifier (CTIA) unit cell includes a CTIA and a clamp capacitor. The CTIA is configured to process a first electrical charge induced by a photocurrent. The clamp capacitor includes a first clamp terminal configured to receive a dynamic signal and a second clamp terminal connected to a CTIA output of the CTIA so as to establish an integrating node. The clamp capacitor delivers a second electrical charge to the CTIA in response to receiving the dynamic signal so as to adjust an integrating reset level at the integrating node.

16 Claims, 11 Drawing Sheets

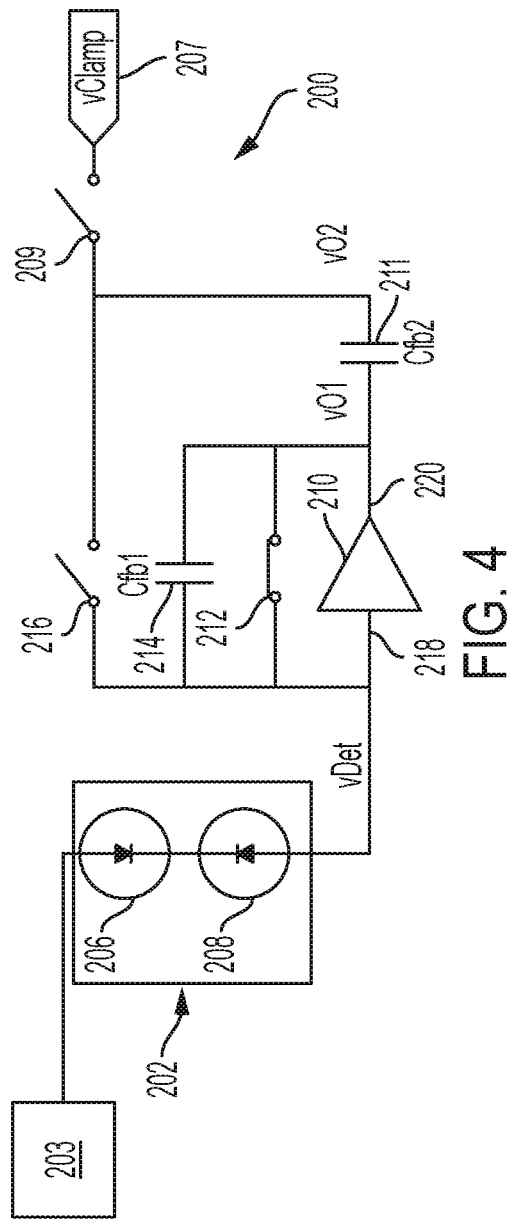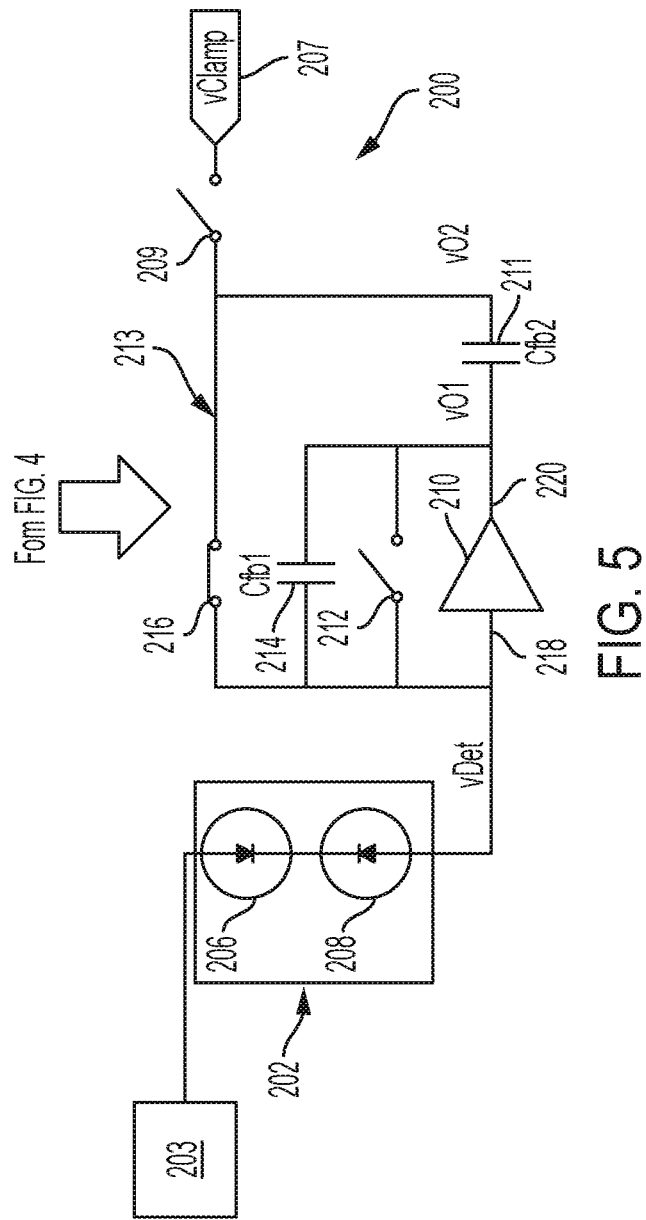

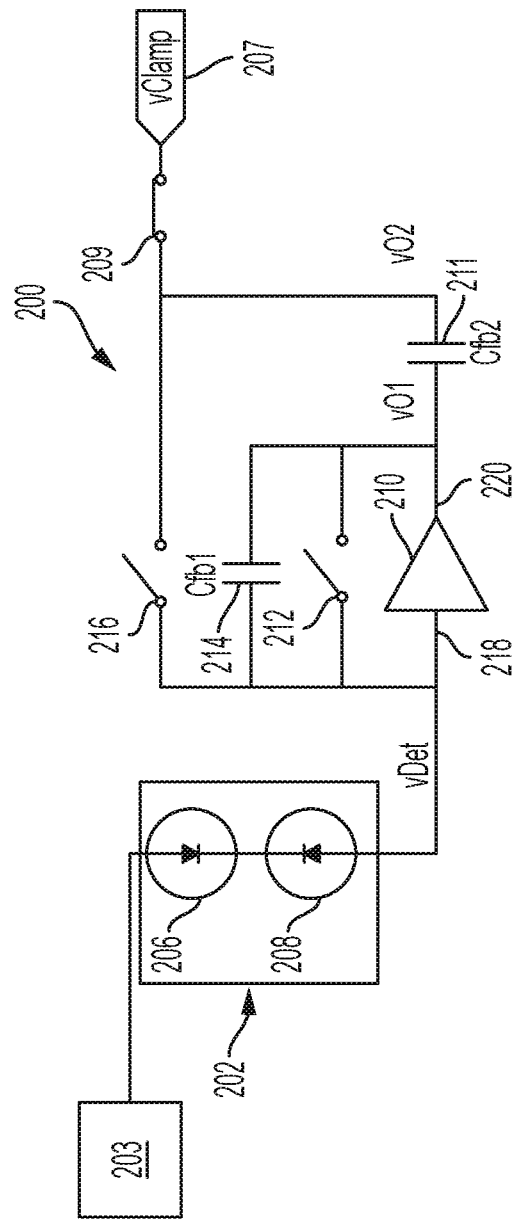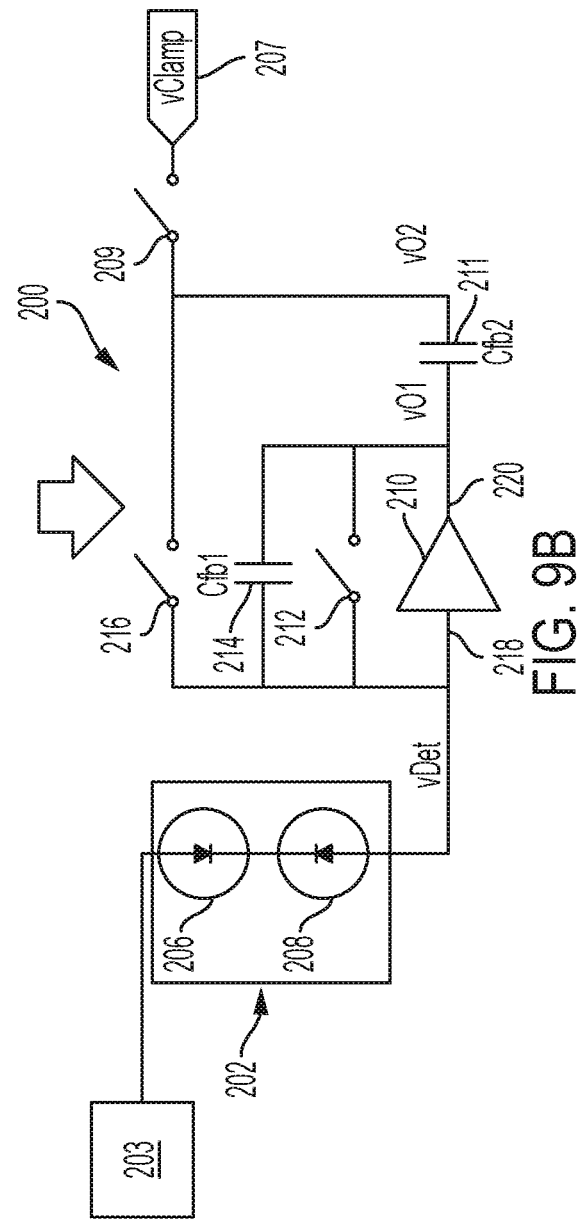

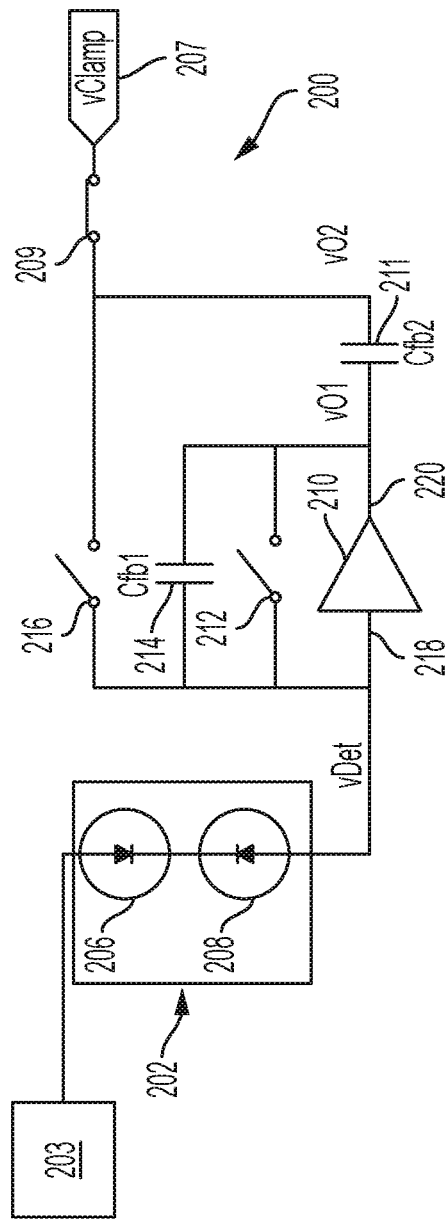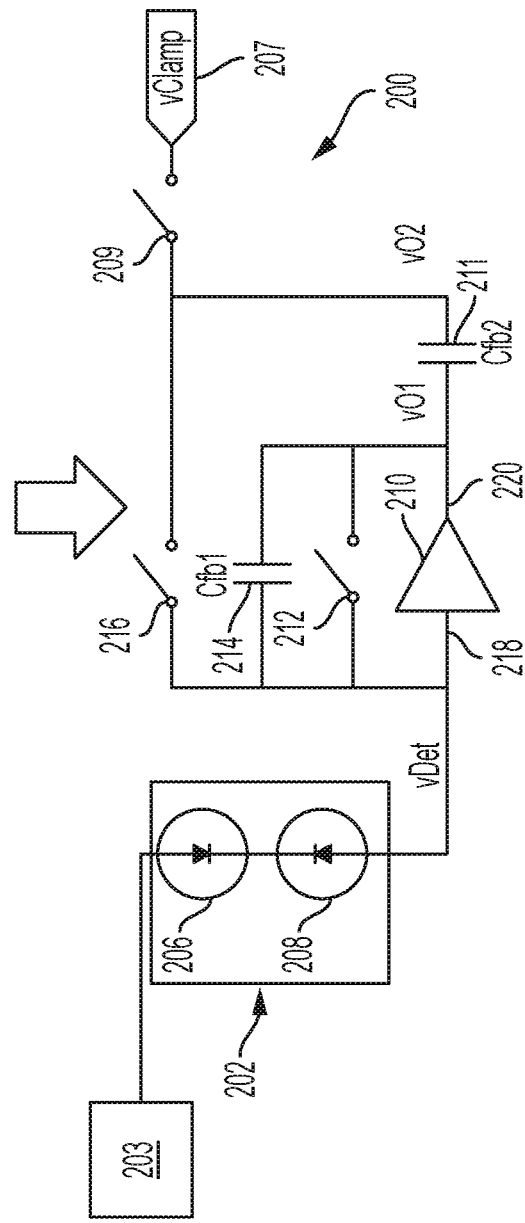

SINGLE-ENDED CAPACITIVE TRANS-IMPEDANCE AMPLIFIER (CTIA) UNIT CELL INCLUDING SHARED CLAMP CAPACITOR CIRCUIT FOR TWO-COLOR IMAGING

BACKGROUND

The present disclosure relates to imaging systems, and more particularly, to a capacitive trans-impedance amplifier (CTIA) unit cell included in an image capturing device.

Image detectors used in image capturing devices generate charge in proportion to light intensity received at the image sensor from a scene viewed by the image sensor. Imaging of scenes with low ambient light requires an image detector to have components with low noise and low capacitance in order to provide high sensitivity. In contrast, imaging a scene with bright ambient light requires the image detector to have components with higher capacitance in order to store more generated charge. These competing capacitance requirements have led to the development of image capturing devices that are typically optimized for either a bright ambient light scene or a low ambient light scene.

SUMMARY

According to a non-limiting embodiment, a capacitive trans-impedance amplifier (CTIA) unit cell circuit comprises a CTIA and a clamp capacitor. The CTIA is configured to process a first electrical charge induced by a photocurrent. The clamp capacitor includes a first clamp terminal configured to receive a dynamic signal and a second clamp terminal connected to a CTIA output of the CTIA so as to establish an integrating node. The clamp capacitor delivers a second electrical charge to the CTIA in response to receiving the dynamic signal so as to adjust an integrating reset level at the integrating node.

According to another non-limiting embodiment, a capacitive trans-impedance amplifier (CTIA) unit cell circuit comprises a CTIA and a clamp capacitor. The CTIA is configured to process a first electrical charge induced by a photocurrent. The clamp capacitor includes a first clamp terminal configured to receive a dynamic signal and a second clamp terminal connected to a CTIA output of the CTIA so as to establish an integrating node having a first integrating reset level. The clamp capacitor is configured to repeatedly deliver a second electrical charge to the CTIA in response to repeatedly receiving the dynamic signal so as to increase the first integrating reset level to a second integrating reset level.

According to yet another non-limiting embodiment, a method of controlling an image capturing device is provided. The method comprises processing, via a CTIA, a first electrical charge induced by a photocurrent; and delivering a dynamic signal to a first clamp terminal of a clamp capacitor. The method further comprises generating a first voltage at an integrating node connected to a second clamp terminal of the clamp capacitor and a CTIA output of the CTIA, and delivering, by the clamp capacitor, a second electrical charge to the CTIA in response to receiving the dynamic signal so as to adjust an integrating reset level at the integrating node.

Additional features and advantages are realized through the techniques of the present disclosure. Other embodiments and aspects are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 4 depicts the CTIA unit cell circuit shown in FIG. 2 after opening a clamp switch to invoke a sampling mode to sample a clamp voltage across a clamp capacitor included in the shared clamp capacitor circuit according to a non-limiting embodiment;

FIG. 5 depicts the CTIA unit cell circuit shown in FIG. 2 operating in an integrating mode to initiate charge integration according to a non-limiting embodiment;

FIGS. 9A, 9B, 9C, and 9D illustrate switching operations to continue adjusting the reset level according to a non-limiting embodiment;

FIG. 13 depicts the CTIA unit cell circuit after reconnecting the clamp capacitor to the clamp voltage supply following an adjustment of the initial reset level according to a non-limiting embodiment;

FIG. 14 depicts the CTIA unit cell circuit after disconnecting the clamp capacitor to invoke a correlated double sampling (CDS) mode configured to perform a CDS operation according to a non-limiting embodiment.

DETAILED DESCRIPTION

Figure 1:
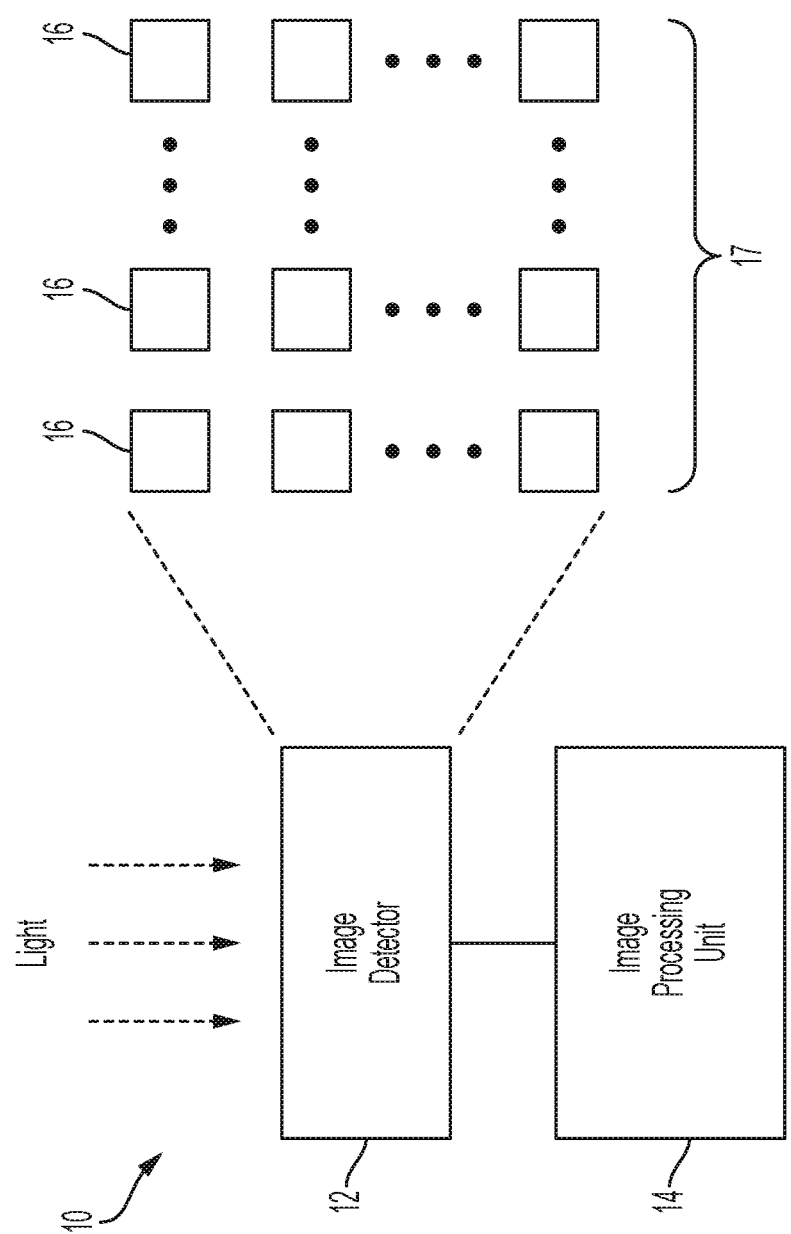
FIG. 1 is a block diagram illustrating an image capturing device configured to capture images in accordance to a non-limiting embodiment.

Existing imaging circuitry often utilizes CTIA architecture in combination with sample-hold circuitry to facilitate light detection. For instance, many conventional read-out integrated circuit (ROIC) unit cells include a CTIA for processing a charge generated by a photodiode included in an image detector. More specifically, the photodiode generates a photocurrent in response to receiving light. The photocurrent induces a charge, which is accumulated at a capacitor within the circuit and is effectively integrated to produce an output voltage. The output voltage corresponds to the intensity of the flux over a given time interval, generally referred to as the integration interval. Such circuits generally convey the output voltage to downstream components and reset the CTIA unit cell (e.g., reset the voltage of the capacitor) to a reset value. For instance, the output voltage may be sampled and held at a sample-hold capacitor, and periodically bled and digitized by circuitry associated with the unit cell to generate one or more binary values that can be further processed by imaging hardware and/or software.

Imaging capturing devices can implement unit cell circuits of various designs to serve as an imaging pixel. Imaging capturing devices configured to detect infrared (IR) light, for example, typically include direct injection circuits or CTIA unit cell circuits (DI) circuits have been employed in focal plane applications and image detection devices. However, DI circuits traditionally have difficulty handling the different requirements of low and bright ambient light situations. More specifically, DI circuits are typically configured for a fixed gain (or charge capacity) which can result in too little gain for the dark regions of an image, or too much gain (i.e., saturation) for the bright regions of an image.

CTIA unit cell circuits have also been employed as image pixels because they provide superior sensitivity compared to a DI unit cell circuit (i.e., DI pixels). Single-end CTIA pixels have been particularly desirable because they provide lower noise compared to differential CTIA pixels, i.e., CTIA unit cell circuits that operate according to a differential amplifier. However, conventional CTIA pixels are limited in functionality in that the detector reset level necessary for pixel reset is set at a fixed voltage and the point at which it starts integrating (i.e., the reset voltage level) is set to a fixed level. In conventional single-end CTIA pixel, this fixed integration level is set by a MOSFET threshold and cannot be changed.

The limitation caused by the fixed integration level described above causes the output of conventional CTIA pixels to integrate in only one direction to provide useful operation. To achieve two-color, dual-polarity detection, however, the pixel integration must be allowed to integrate in opposing directions (i.e., in a positive integrating direction to capture the first light color or first energy band and a negative integrating direction to capture the second light color or second energy band). Consequently, conventional CTIA unit cell circuits cannot serve as a pixel capable of facilitating a two-color, dual-polarity image capturing device.

Various non-limiting embodiments described herein provide a low-noise (e.g., reduced kTC noise) CTIA unit cell circuit that employs an image detector including an opposing pair of image sensors. Each image sensor is configured to detect a respective color of light. The CTIA unit cell circuit allows for selectively setting a targeted output voltage that can serve as integration reset levels for both image sensors using the single-ended CTIA. In this manner, the CTIA unit cell circuit described herein can serve as a pixel capable of facilitating a two-color, dual-polarity image capturing device.

With reference now to FIG. 1, an image capture device 10 configured to capture images is illustrated according to a non-limiting embodiment. The image capture device 10 can be constructed as various devices including, but not limited to, a digital camera, video camera, or other photographic and/or image capturing equipment. The image capture device 10 includes an image detector 12 and an image processing unit 14 (e.g., an image processor or controller configured to perform image processing). The image detector 12 may be an APS or other suitable light sensing device that can capture images. The image processing unit 14 may be a combination of hardware, software, and/or firmware that is operable to receive signal information from the image detector 12 and convert the signal information into a digital image.

In the illustrated example, the image detector 12 includes an array 17 of unit cells 16. Each unit cell 16 accumulates charge proportional to the light intensity at its location in the field of view of the image detector 12. Each unit cell 16 may correspond to a pixel in the captured electronic image. Each unit cell 16 may temporarily store the accumulated charge for use by the processing unit 14 to create an image. The stored charge, for example, may be converted into a voltage and the value of the voltage may be sampled by the processing unit 14 in order to digitize and store the value into some form of memory.

A particular method for image capture using the image capture device 10 may be rolling shutter capture. Rolling shutter capture is a method that captures each row of pixels from the image detector 12 in order. For example, rolling shutter capture may expose the top row of pixels of the image detector 12 to light, followed by the second row, followed by the third row, and so forth until the last row of pixels of the image detector 12 is exposed to light. Another example of a method by which the image processing unit 14 may receive pixel information captured by image detector 12 is "rolling read" (sometimes referred to as a "ripple read"). A rolling read is a method that processes each row of pixels from the image detector 12 in order. Similar to rolling shutter capture, ripple read may process the top row of pixels of the image detector 12, followed by the second row, followed by the third row, and so forth until the last row of pixels of the image detector 12 is processed. A rolling reset operation to reset the rows of pixels of the image detector 12 may be performed similarly.

The rolling shutter capture, rolling read, and rolling reset operations are typically performed on consecutive rows. For example, a rolling capture operation may begin with a first row of unit cells 16. As the rolling capture operation moves to the second row, a rolling read operation may begin on the first row of unit cells 16. After the rolling capture operation moves to the third row, the rolling read operation may begin on the second row and a rolling reset operation may begin on the first row. This may continue until the last row is processed. Once the last row is processed, the image may be processed and stored by the processing unit 14.

Although rolling based operations are described above for the capturing of an image using the image capture device 10, in other embodiments, the image capture device 10 may use a different image capture method. For example, in at least one embodiment, the image capture device utilizes a global shutter-based method in which all the unit cells 16 in the image capture device 10 are configured to start integrating flux and stop integrating flux at the same time.

Figure 2:
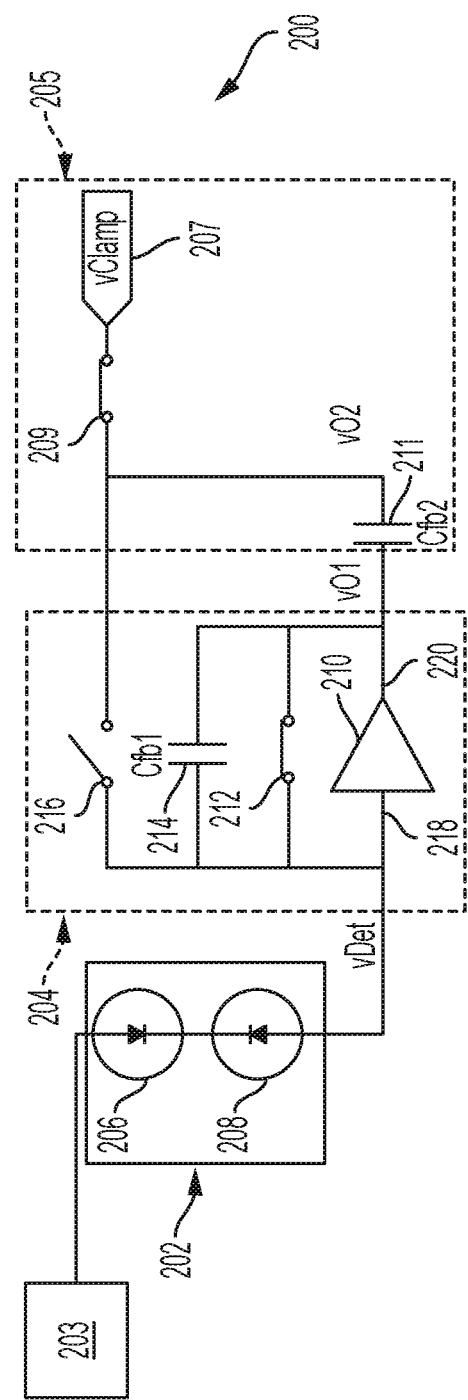
FIG. 2 depicts a CTIA unit cell circuit including a shared clamp capacitor circuit operating in a reset mode to set an initial reset level of a CTIA according to a non-limiting embodiment.

Turning now to FIG. 2, a CTIA unit cell 200 included in an image capturing device is illustrated according to a non-limiting embodiment. The CTIA unit cell 200 includes an image detector 202, a switch network 204, and a clamping circuit 205. The image detector 202 is configured to generate a photocurrent in response to receiving light. The image detector 202 includes a pair of opposing connected photodiodes 206 and 208, which serve as image sensors capable of facilitating two-color, dual-band image detection. The first photodiode 206 can be configured to detect a first color or first energy band (e.g., bright ambient light) while the second photodiode 208 can be configured to detect a different second color or second energy band (e.g., low ambient light).

In a non-limiting embodiment, the opposing connection of the photodiodes 206 and 208 can be established by connecting a first cathode of the first photodiode 206 to a second cathode of the second photodiode 208. According to another non-limiting embodiment, the opposing connection of the photodiodes 206 and 208 can be established by connecting a first anode of the first photodiode 206 to a second anode of the second photodiode 208. In either arrangement, the first and second photodiodes 206 and 208 have an opposite polarity and can be selectively activated based on a voltage polarity applied to the anode of the first diode 206 and the resulting direction of electrical current flowing through the image detector 202 to establish a detector bias. For example, the first photodiode 206 realizes a forward biased state while the second photodiode 208 realizes a reverse biased state when current exits the image detector 202. As a result, the first photodiode 206 acts as a short-circuit (i.e., is deactivated) while second photodiode 208 is reverse-biased (i.e., activated, and responsive to light). However, the second photodiode 208 realizes a forward biased state while the first photodiode 206 realizes a reverse biased state when current flows into the image detector 202. As a result, the second photodiode 208 is deactivated while the first photodiode 206 is activated (i.e., responsive to light). In this manner, the image detector 202 can dynamically activate the proper photodiode 206 or 208 to detect the first color or first energy band (e.g., bright mid-wave infrared light) or the second color or second energy band (e.g., dim short-wave infrared ambient light), respectively.

In one or more non-limiting embodiments, a controller 203 can be connected to the image detector 202 (e.g., the anode of the first photodiode 206) to select the detector polarity. For example, the controller 203 can drive current in a forward direction through the image detector 202 to activate photodiode 208. Accordingly, a positive integration can be performed by the unit cell 200 to detect a first color or first energy band. On the other hand, the controller 203 can drive current in a reverse direction through the image detector 202 to activate the second photodiode 206. Accordingly, a negative integration can be performed by the unit cell 200 to detect a second color or second energy band.

The switch network 204 includes a capacitive transimpedance amplifier (CTIA) 210, a reset switch 212, a feedback capacitor 214, and a feedback switch 216. Although not illustrated, any one of the CTIA 210, the reset switch 212, the feedback capacitor 214, and the feedback switch 216 can receive one or more controls signals that operate the respective switch. For example, the control signal can transition a given switch from a first state (e.g., an open state) to a second state (e.g., a closed state). In another example, the control signal can include a gate control signal that is applied to a gate of a field effect transistor (FET). In one or more non-limiting embodiments, the gate control signal can include a clock signal that continuously transitions between a logic "1" state and a logic "0" state as understood by one of ordinary skill in the art.

Figure 15:
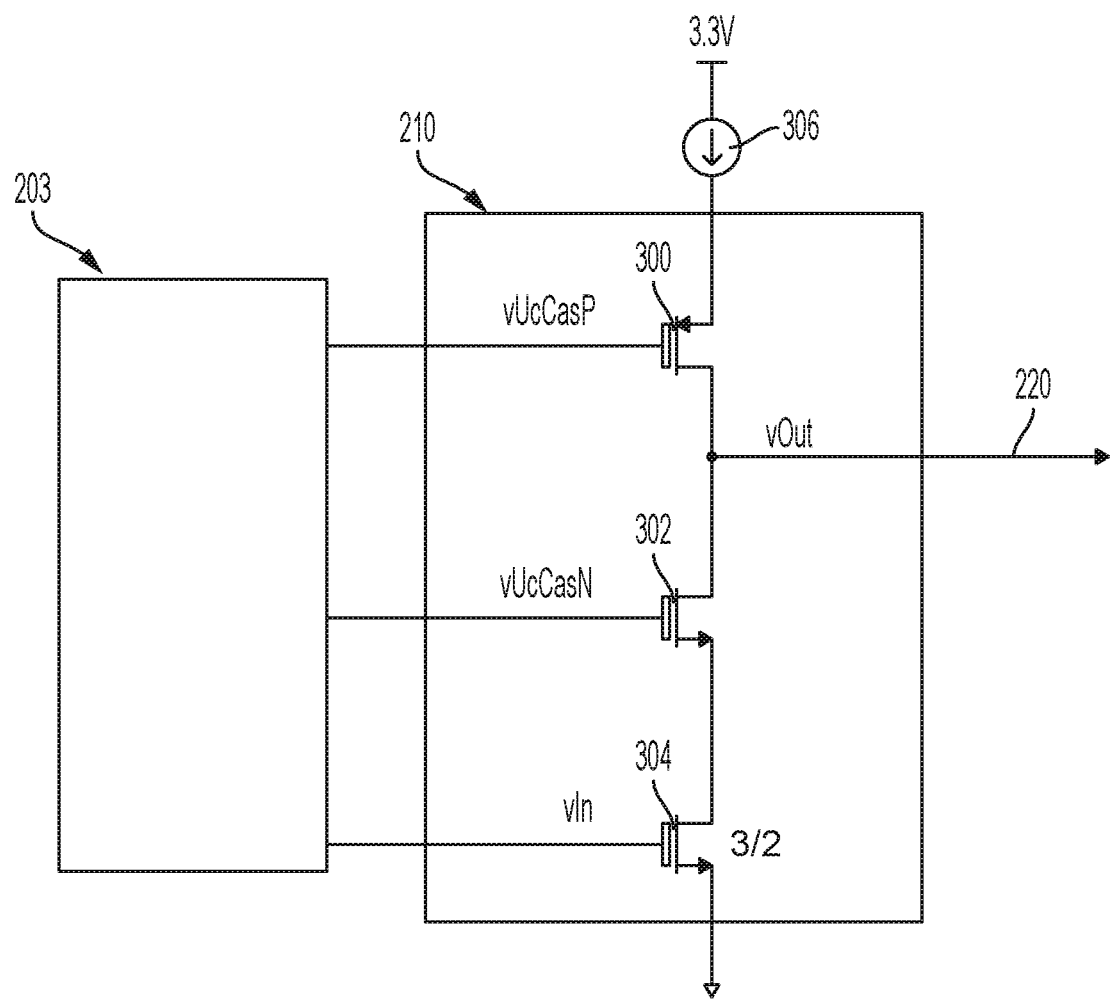
FIG. 15 is a schematic diagram of a CTIA included in the CTIA unit cell shown in FIG. 2 according to a non-limiting embodiment.

The CTIA 210 can be constructed using a combination of field effect transistors (FETs) as understood one of ordinary skill in the art. Referring to FIG. 15, for example, a CTIA 210 is illustrated according to a non-limiting embodiment. The CTIA 210 includes a p-channel field effect transistor (PFET) 300, a first n-channel field effect transistor (NFET) 302, and a second NFET 304. The PFET 300 includes a source connected to a current source 306 and a drain connected to a drain of the first NFET 302. The gate of the PFET 300 is configured to receive a gate control signal (vUcCasP), which can be provided by a controller 203. The node established by connecting the drain of the PFET 300 and the drain of the first NFET 302 provides an output 220 of the CTIA 210. The source of the first NFET 302 is connected to the drain of the second NFET 304, while the gate of the first NFET 302 is configured to receive a gate control signal (vUcCasN), which can be provided by the controller 203. The second NFET 304 includes a source connected to a ground potential and a gate configured to receive a gate signal (vIn) provided by the controller 203. Accordingly, the PFET 300, first NFET 302, and second NFET 304 establish a threshold voltage (vTn) and an overdrive voltage (vODn) of the CTIA 210. The threshold voltage (vTn) can be defined, for example, at about 0.7 V and a overdrive voltage (vODn) can be defined, for example, at about 0.05 V.

The CTIA 210, reset switch 212, and feedback capacitor 214 are connected in parallel with one another. For example, the CTIA includes an input 218 and an output 220. The input 218 is connected in common with the image detector 202 (e.g., the anode of the second photodiode 208), a first terminal of the reset switch 212, a first terminal of the feedback capacitor 214, and a first terminal of the feedback switch 216 so as to establish an input node (vDet). Accordingly, the input 218 is configured to receive the photocurrent generated by the image detector 202 in response to detecting light. The output 220 is connected to an opposing terminal of the reset switch 212, an opposing terminal of the feedback capacitor 214 and aa terminal of the clamp capacitor 211. The position of the reset switch 212 effectively invokes either a reset mode or an integration mode of the CTIA unit cell 200. Accordingly, an integration of the charge associated with the CTIA 210 can be determined by measuring a voltage across the feedback capacitor 214 which also appears at the integrating node vO1.

The clamping circuit 205 includes a clamp voltage supply 207, a clamp switch 209, and a clamp capacitor 211. Although not illustrated, the clamp switch 209 can be connected to the controller 203 to receive one or more controls signals. As described herein, the control signal can transition the clamp switch 209 from a first state (e.g., an open state) to a second state (e.g., a closed state). In another example, the control signal can include a gate control signal when the clamp switch 209 is implemented as a FET. In one or more non-limiting embodiments, the gate control signal can include a clock signal that continuously transitions between a logic "1" state and a logic "0" state as understood by one of ordinary skill in the art.

A first terminal of the clamp switch 209 is connected to the clamp voltage 207, while the opposing second terminal of the clamp switch 209 is connected in common with the second terminal of the feedback switch 216. A first terminal of the clamp capacitor 211 is connected in common with the second terminal of the clamp switch 209 and the second terminal of the feedback switch 216 to establish a clamp node (vO2). The opposing second terminal of the clamp capacitor 211 is connected in common with the output 220 of the CTIA 210, the second terminal of the reset switch 212, and the second terminal of the feedback capacitor 214. The connection of the second terminal of the clamp capacitor 211, the output 220 of the CTIA 210, the second terminal of the reset switch 212, and the second terminal of the feedback capacitor 214 effectively establishes an integrating node (vO1), at which a reset level (vRst) of the CTIA 210 can be dynamically adjusted as described herein.

The clamp voltage 207 can be provided as a constant DC voltage, which can be set, for example, to about 0.55 volts (V). In other non-limiting embodiments, a dynamic voltage can be applied to the clamp voltage 207 (vClamp). The value of the clamp capacitor 211 can be set to a value that is greater than the value of the feedback capacitor 214. For example, the clamp capacitor 211 can have a value of about 100 femtofarads (fF), while the feedback capacitor 214 can have a value of about 10 fF. It should be appreciated, however, that the constant DC voltage value and the values of the clamp and feedback capacitors are not limited thereto and can be set to different values based on the application of the CTIA unit cell 200.

The clamp switch 209 can be operated to facilitate sampling of the voltage present at the clamp node (VO2). For example, closing the clamp switch 209 applies the constant DC voltage to the clamp capacitor 211. Accordingly, the clamp node vO2 is effectively "clamped" or held at the constant DC voltage (e.g., 0.55 V). Moreover, holding the clamp capacitor 211 at the clamp voltage 207 prevents any charge noise (also referred to as "kTC noise" or "Johnson-Nyquist noise") contributed by the feedback capacitor 214 from appearing in the voltage present at the clamp node (vO2) measured across the clamp capacitor 211. In this manner, the clamp capacitor 211 can be utilized to perform a correlated double sampling (CDS) operation to remove the kTC noise from the integrating node vO1 measured during integration of the CTIA unit cell 200 as described in greater detail below.

Figure 3:
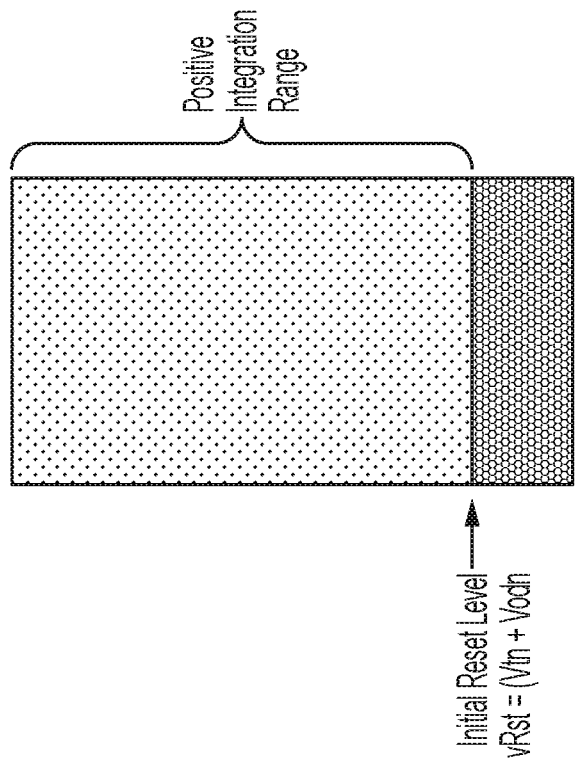
FIG. 3 is a diagram depicting an initial reset level of a CTIA unit cell circuit set using the shared clamp capacitor circuit shown in FIG. 2 according to a non-limiting embodiment.

Still referring to FIG. 2, the CTIA unit cell circuit 200 is shown operating in a reset mode to set an initial reset level (vRst) of the CTIA 210 according to a non-limiting embodiment. The initial reset level (vRst) is defined with respect to the input node (vDet) connected the CTIA input 218 and the integrating node (vO1) connected to the CTIA output 220. The reset mode is invoked when the feedback switch 216 is open, while the reset switch 212 and the clamp switch 209 are both closed. Accordingly, an initial reset voltage level (vRst) of the CTIA 210 is set as shown in FIG. 3. The initial reset voltage level (vRst) can be defined as: vRst=vTn+vODn, where vTn+vODn=vO1.

Turning now to FIG. 4, the CTIA unit cell circuit 200 is shown operating in a sampling mode according to a non-limiting embodiment. The sampling mode allows for sampling the clamp voltage (vCLAMP) with respect to the set initial reset voltage (vRst) present at the CTIA output 220, i.e., at the integrating node vO1. In this manner, the clamp voltage (vCLAMP) can be sampled to provide an offset to the unit cell circuit 200. This offset can facilitate changing the reset value or integration starting point measured at the integrating node vO1, while also facilitating a CDS operation for removing charge noise that can appear at the integrating node (vO1) across the feedback capacitor 214 as described in greater detail below.

Figure 6:
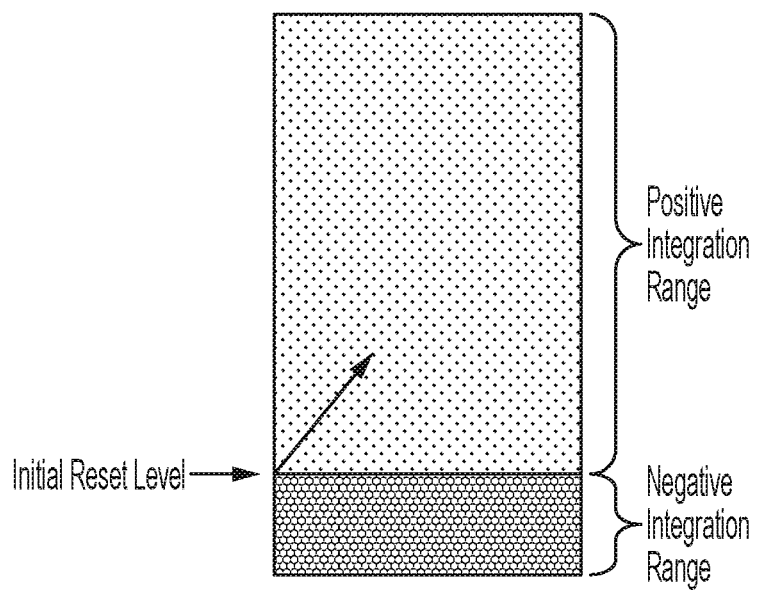
FIG. 6 is a diagram depicting a CTIA integrating node (vO1) of the CTIA showing positive integration of the charge beginning at the initial reset level and extending through a positive integration range according to a non-limiting embodiment.

With reference to FIG. 5, the CTIA unit cell circuit 200 is shown operating in an integrating mode to initiate integration of the charge through the CTIA 210 according to a non-limiting embodiment. In other words, opening the reset switch 212 effectively removes the CTIA 210 from reset. Providing the clamp capacitor 211 in a feedback configuration allows the feedback capacitor 214 to begin accumulating charge along with the capacitor 211, which starts at the initial reset level (vRst) and is integrated through the positive integrate range of the CTIA 210 as shown in FIG. 6. The parallel arrangement of the feedback capacitor 214 and the clamp capacitor 211 increases the amount of charge at which the CTIA unit cell circuit 200 can integrate.

Figure 7:
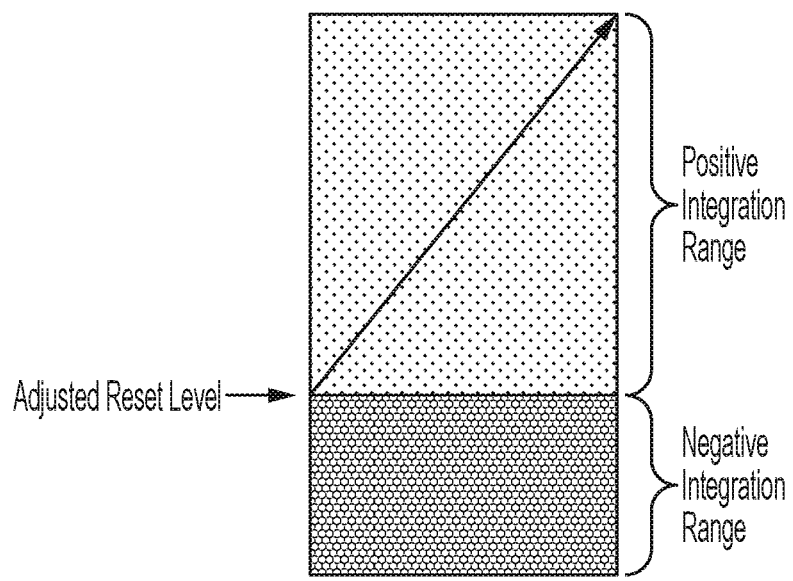
FIG. 7 is a diagram depicting an adjusted reset level measured at the CTIA integrating node (vO1) following integration of the charge associated with the CTIA according to a non-limiting embodiment.

In addition, the switching states of the reset switch 212 and the feedback switch 216 swings the clamp capacitor 211 in parallel with feedback capacitor 214 to define a capacitor divider circuit. The first terminal of the clamp capacitor 211 is also placed in connection with the input 218 of the CTIA 210 via the feedback path 213, thereby effectively connecting the clamp node vO2 to the input voltage (vDet) applied to the CTIA 210. As a result, the charge accumulated in the clamp capacitor 211 is delivered to the CTIA 210 and in turn adjusts (e.g., increases) the voltage present at the integrating node (vO1) connected to the CTIA output 220 while the CTIA continues integrating charge. In other words, the voltage at the CTIA output 220 is no longer fixed according to vTn+vODn, but rather is now increased according to the added charge injected from the clamp capacitor 211 to define an adjusted reset level (e.g., a reduced well-capacity) as shown in FIG. 7. The clamp capacitor 211 can effectively "hold" the added charge until the reset mode described herein is invoked (see e.g., FIG. 2), thereby facilitating adjustment of the initial reset level.

Figure 8:
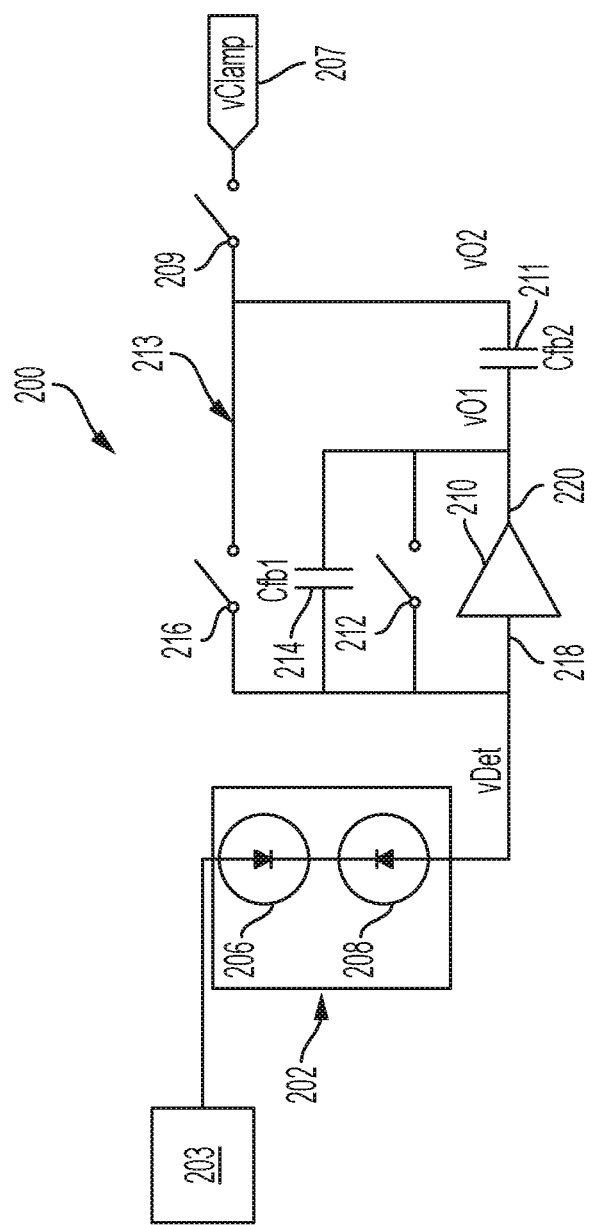
FIG. 8 depicts the CTIA unit cell circuit shown in FIG. 2 after disconnecting the clamp capacitor to set the gain of the CTIA having an adjusted reset level according to a non-limiting embodiment.

Turning to FIG. 8, the CTIA unit cell circuit 200 is illustrated after opening the feedback switch 216. By opening the feedback switch 216, the feedback path 213 is opened and the clamp capacitor 211 is effectively disconnected. Accordingly, the gain of the CTIA 210 is therefore effectively set by capacitor 214, while the initial reset level shown in FIG. 3 has been increased to a new reset level (i.e., a new integration starting voltage) as shown in FIG. 7. In this manner, the reset level (i.e., the integration starting voltage) can be dynamically adjusted to support different detector polarities and dynamically adjust the dynamic range of the CTIA unit cell 200.

Although the aforementioned switching operations facilitated adjusting the initial reset voltage (vRst) measured at the integrating node vO1 to a single new reset voltage level, the invention is not limited to a single reset voltage adjustment. Rather, the operation of adding stored charge from the clamp capacitor 211 to the feedback capacitor 214 can be repeated over several cycles to continuously adjust (e.g., increase) the reset voltage level (vRst) measured at integrating node vO1.

Figure 9C:
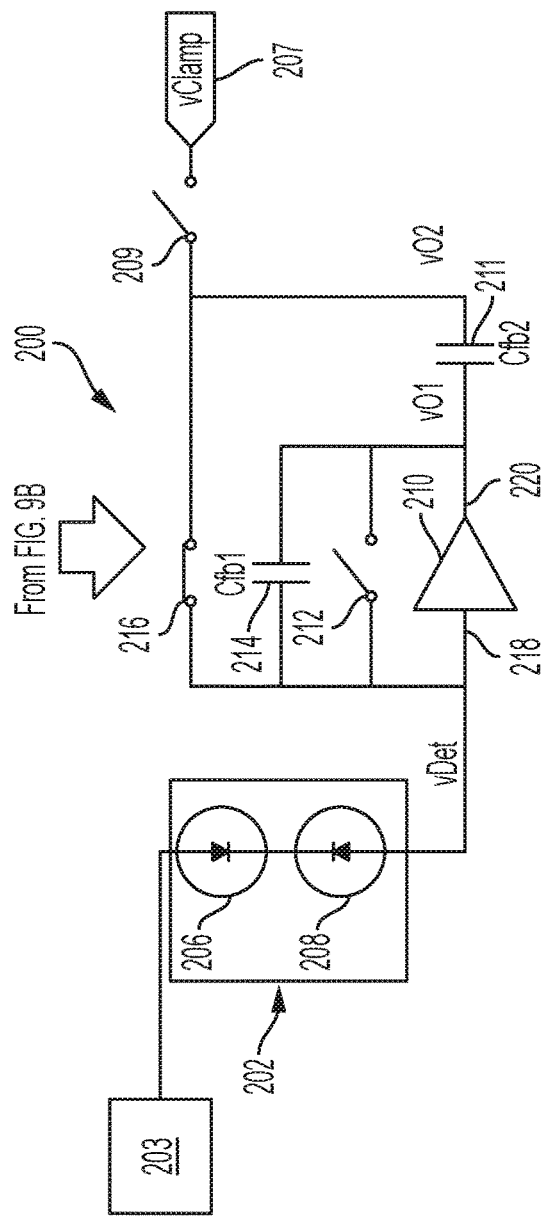

Turning to FIGS. 9A, 9B, 9C and 9D, various switching operations described herein are repeated to continuously adjust the reset voltage level. With reference to FIG. 9A, the CTIA unit cell circuit 200 is shown with the clamp capacitor 211 reconnected to the clamp voltage supply 207 after increasing the initial reset level (see FIG. 3) to the new reset level (see FIG. 7). Accordingly, the clamp capacitor 211 samples the clamp voltage relative to the amplifier output.

At FIG. 9B, the clamp switch 216 is opened before closing the feedback switch 212. Accordingly, the clamp capacitor 211 is disconnected from the clamp voltage source 207 and the gain of the CTIA 210 is effectively set by the capacitor 214. In this manner, the initial reset level shown is again increased to a new reset level.

Referring to FIG. 9C, the feedback switch 216 is closed so as to establish a circuit similar to that established by the switching network shown in FIG. 5. Accordingly, the clamp capacitor 211 is connected in parallel with feedback capacitor 214 and the first terminal of the clamp capacitor 211 is placed in connection with the input 218 of the CTIA 210 such that the charge accumulated in the clamp capacitor 211 is distributed among both the clamp capacitor and the feedback capacitor 214. The added charge again adjusts (e.g., increases) the voltage present at the integrating node (vO1) connected to the CTIA output 220 so as to set a new adjusted reset level (e.g., further increases the reset level).

Figure 9D:
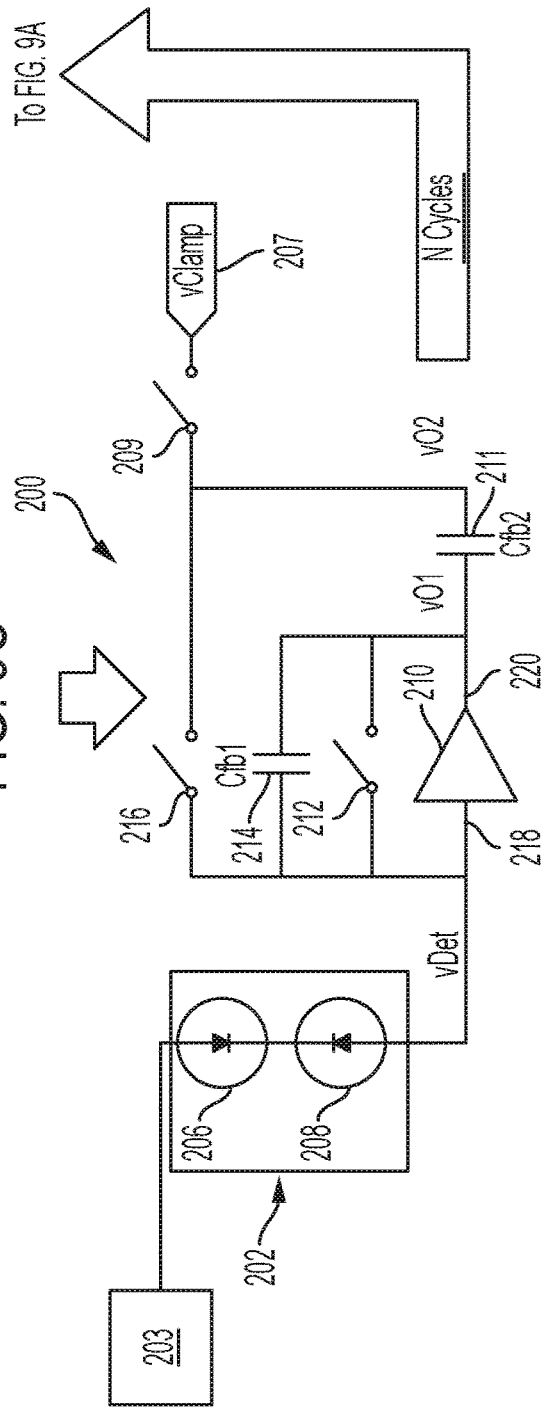

Turning to FIG. 9D, the feedback switch 216 is again opened so as to again disconnect the clamp capacitor 211. Accordingly, a new gain of the CTIA 210 is set by the feedback capacitor 214. As described herein, the switching operations described in FIGS. 9A-9D can be repeated "N" cycles to continuously adjust the reset level.

Figure 10:
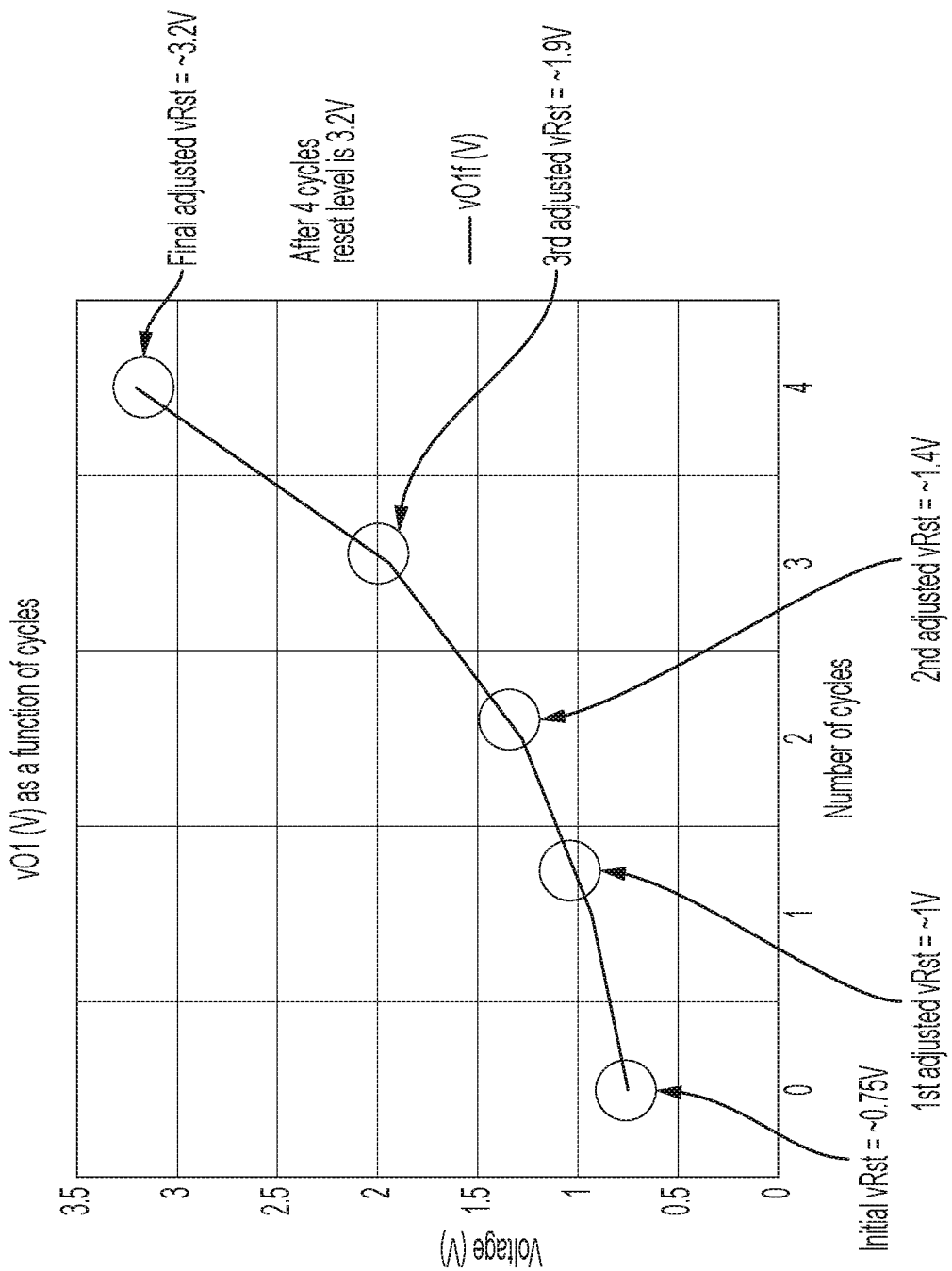
FIG. 10 is a graph diagram depicting the continued adjustment of a reset level resulting from repeatedly performing the switching operations illustrated in FIGS. 9A, 9B, 9C, and 9D according to a non-limiting embodiment.

Referring to FIG. 10, for example, a graph diagram illustrates the repeated increase of the reset level over four cycles. For instance, the initial reset level is set to about 0.75V using the switching combination described in FIG. 2, for example. A first cycle of switching operations (i.e., described in FIGS. 9A-9D) is then performed so as to set a first adjusted reset level measured at the integrating node vO1 of about 1V. A subsequent second cycle of switching operations is performed so as to set a second adjusted reset level of about 1.4V. A subsequent third cycle of switching operations is performed so as to set a third adjusted reset level of about 1.9V. A fourth cycle of switching operations is then performed so as to set a final adjusted reset level of about 3.2V. Although four cycles are described, it should be appreciated that the number of cycles is not limited thereto. In this manner, the reset level can be dynamically increased to support different detector polarities.

Figure 11:
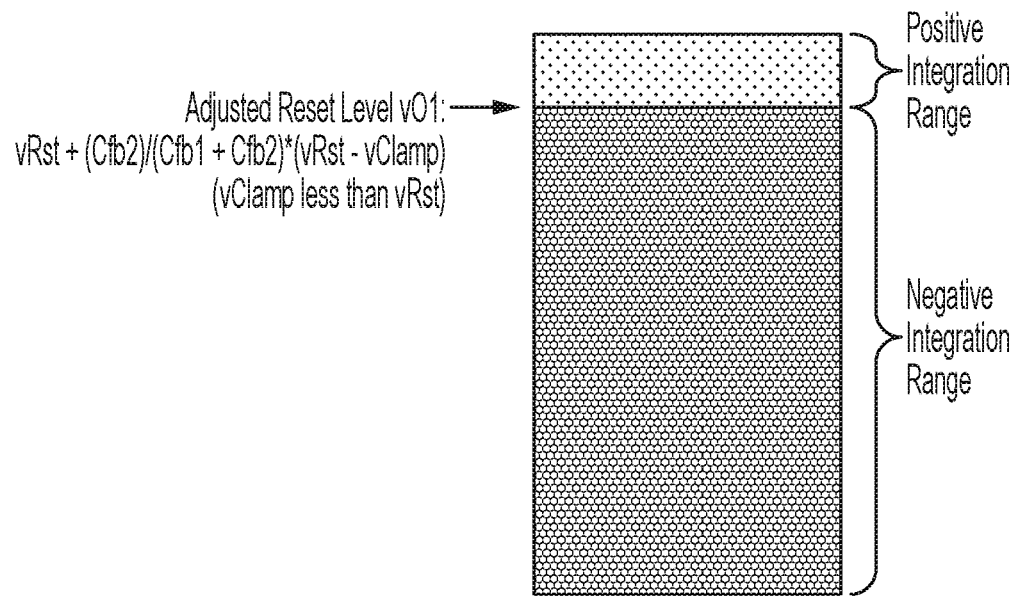
FIG. 11 is a diagram depicting the increased reset level resulting from repeatedly performing the switching operations illustrated in FIGS. 9A, 9B, 9C, and 9D according to a non-limiting embodiment.
Figure 12:
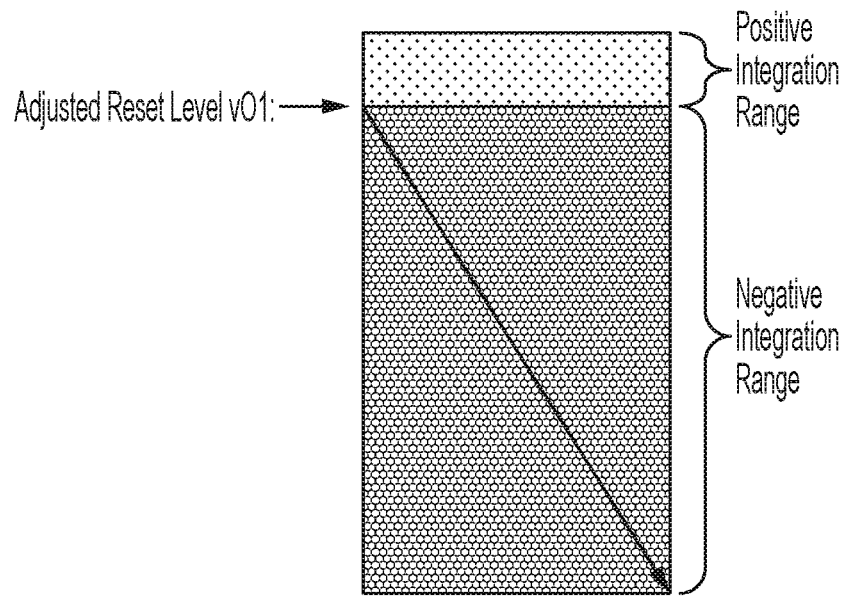
FIG. 12 is a diagram depicting a negative integration of the charge associated with the CTIA beginning at the increased reset level shown in FIG. 11 and extending through a negative integration range according to a non-limiting embodiment.

The increased reset level also facilitates the ability to increase the dynamic range when performing a charge integration according to an opposite detector polarity (e.g., when performing a negative integration). For instance, the initial reset level set in FIG. 3 can be continuously increased as described herein to set a higher reset level as shown in FIG. 11. Accordingly, the negative integration range is now significantly larger compared to the initial negative integration range defined by the initial reset level shown in FIG. 3. The controller 203 can then activate the second photodiode 208 and initiate a negative integration, which starts at the adjusted reset level and extends through the increased negative integration range as shown in FIG. 12. Accordingly, the CTIA unit cell circuit 200 allows for dynamically setting an integration reset levels for both photodiodes 206 and 208 that allows for performing integration according to opposing detector polarities, where each integration is performed over a wide dynamic range. In this manner, the CTIA unit cell circuit 200 described herein can serve as a pixel capable of facilitating a two-color, dual-polarity image capturing device.

As described herein, the clamp capacitor 211 can not only be utilized to dynamically adjust the reset level of the CTIA unit cell 200, but can also be utilized to perform a correlated double sampling (CDS) operation to remove the kTC noise from the voltage present at the integrating node vO1 measured during integration of the CTIA unit cell 200. With reference to FIG. 13, the CTIA unit cell circuit 200 is depicted after closing the clamp switch 209 following an adjustment of the initial reset level as described above. Accordingly, the clamp capacitor 211 is reconnected to the clamp voltage supply 207 will sample voltage in response to the applied clamping voltage (vCLAMP). However, the voltage present at the clamp node (vO2) across the clamp capacitor 211 excludes kTC noise because the clamp capacitor 211 is clamped by the constant DC clamping voltage (vCLAMP).

FIG. 14 depicts the CTIA unit cell circuit 200 having a switching arrangement capable of facilitating a CDS operation according to a non-limiting embodiment. For example, the clamp switch 209 is opened so as to disconnect the clamp capacitor 211 from the clamp voltage supply 207 and invoke a CDS mode. Although the clamp capacitor 211 may realize some form of voltage noise once disconnected from the clamp voltage supply 207, the amount of voltage noise is relatively insignificant because the value of the clamp capacitor 211 (e.g., 100 fF) is significantly larger than the value of the feedback capacitor 214 (e.g., 10 fF). Accordingly, the clamp capacitor 211 can operate as a CDS device that effectively removes the kTC noise contributed by the feedback capacitor 214 to provide a "clean" signal at the clamp node vO2.

As described herein, various non-limiting embodiments described herein provide a low-noise (e.g., reduced kTC noise) CTIA unit cell circuit that employs an image detector including an opposing pair of photo sensors configured to facilitate two-color, dual-polarity image capturing. Each photo sensor is configured to detect a respective color or bandwidth of light. The CTIA unit cell circuit employs a shared clamping circuit that includes a clamp capacitor configured to not only dynamically set the reset integration levels for both image sensors using the single-ended CTIA, but also perform a CDS operation. In this manner, a low-noise CTIA unit cell circuit described herein can serve as a pixel capable of facilitating a two-color, dual-polarity image capturing device.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiments were chosen and described in order to best explain the principles of the present disclosure and the practical application, and to enable others of ordinary skill in the art to understand the present disclosure for various embodiments with various modifications as are suited to the particular use contemplated.

While the preferred embodiments to the present disclosure have been described, it will be understood that those skilled in the art, both now and in the future, may make various improvements and enhancements which fall within the scope of the claims which follow. These claims should be construed to maintain the proper protection of the inventive teachings recited herein.

What is claimed is:

1. A capacitive trans-impedance amplifier (CTIA) unit cell included in an image capturing device, the CTIA unit cell comprising:
    an image detector including a first photodiode configured to detect light having a first color in response to receiving a first voltage polarity and a second photodiode configured to detect light having a second color different from the first color in response to receiving a second voltage polarity opposite the first voltage polarity;
    a CTIA configured to process a first electrical charge induced by a photocurrent generated by the first photodiode or the second photodiode;
    a clamp capacitor including a first clamp terminal configured to receive a dynamic signal and including a second clamp terminal connected to a CTIA output of the CTIA so as to establish an integrating node,
    wherein the clamp capacitor delivers a second electrical charge to the CTIA in response to receiving the dynamic signal so as to adjust an integrating reset level at the integrating node,
    wherein a first charge integration operation is performed by positively integrating the first electrical charge induced by the photocurrent generated by the first photodiode starting from the first integration reset level, and
    wherein a second charge integration operation is performed by negatively integrating the first electrical charge induced by the photocurrent generated by the second photodiode starting from the second integration reset level.

2. The CTIA unit cell of claim 1, further comprising a feedback capacitor including a first feedback terminal connected to a CTIA input of the CTIA and a second feedback terminal connected to the CTIA output,
    wherein the second electrical charge is distributed among both the feedback capacitor and the clamp capacitor to increase the integrating reset level.

3. The CTIA unit cell of claim 2, wherein the image detector is configured to selectively detect the light having the first color and the light having the second color different from the first color and is configured to generate the photocurrent in response to receiving the light.

4. The CTIA unit cell of claim 3, wherein a dynamic range of the image detector is increased in response to delivering the second electrical charge to the CTIA.

5. The CTIA unit cell of claim 1, further comprising a clamp switch connected to the first clamp terminal of the clamp capacitor to establish a clamp node, the clamp switch configured to selectively deliver the dynamic signal to the clamp capacitor.

6. The CTIA unit cell of claim 5, wherein the clamp capacitor is configured to perform a correlated double sampling (CDS) operation based at least in part on a position of the clamp switch.

7. The CTIA unit cell of claim 6, wherein the CDS operation removes charge noise from the clamp node.

8. A capacitive trans-impedance amplifier (CTIA) unit cell included in an image capturing device, the CTIA unit cell comprising:
    a CTIA configured to process a first electrical charge induced by a photocurrent;
    a clamp capacitor including a first clamp terminal configured to receive a dynamic signal and including a second clamp terminal connected to a CTIA output of the CTIA so as to establish an integrating node having a first integrating reset level;
    a first photodiode configured to detect light having a first color in response to receiving a first voltage polarity; and
    a second photodiode configured to detect light having a second color different from the first color in response to receiving a second voltage polarity opposite the first voltage polarity,
    wherein the clamp capacitor repeatedly delivers a second electrical charge to the CTIA in response to repeatedly receiving the dynamic signal so as to increase the first integrating reset level to a second integrating reset level, and
    wherein a first charge integration operation is performed by positively integrating the first electrical charge induced by the photocurrent generated by the first photodiode starting from the first integration reset level, and
    wherein a second charge integration operation is performed by negatively integrating the first electrical charge induced by the photocurrent generated by the second photodiode starting from the second integration reset level.

9. The CTIA unit cell of claim 8, further comprising a feedback capacitor including a first feedback terminal connected to a CTIA input of the CTIA and a second feedback terminal connected to the CTIA output,
    wherein the second electrical charge is distributed among both the feedback capacitor and the clamp capacitor to increase the integrating reset level.

10. The CTIA unit cell of claim 9, further comprising an image detector configured to selectively detect light having a first color and light having a second color different from the first color and to generate the photocurrent in response to receiving the light.

11. The CTIA unit cell of claim 10, wherein the second integrating reset level increases a dynamic range of the image detector.

12. A method of operating a capacitive trans-impedance amplifier (CTIA) unit cell included in an image capturing device, the method comprising:
    generating, by a first photodiode, a photocurrent starting from a first integration reset level and generating, by a second photodiode, the photocurrent starting from a second integration reset level;
    performing a first charge integration operation by positively integrating a first electrical charge induced by the photocurrent, and performing a second charge integration operation by negatively integrating the first electrical charge induced by the photocurrent generated by the second photodiode;
    processing, via a CTIA, the first electrical charge induced by the photocurrent;
    delivering a dynamic signal to a first clamp terminal of a clamp capacitor;
    generating a first voltage at an integrating node connected to a second clamp terminal of the clamp capacitor and a CTIA output of the CTIA; and
    delivering, by the clamp capacitor, a second electrical charge to the CTIA in response to receiving the dynamic signal so as to adjust an integrating reset level at the integrating node.

13. The method of claim 12, wherein adjusting the integrating reset level includes increasing the integrating reset level in response to distributing the second electrical charge among both a clamp capacitor and a feedback capacitor, the feedback capacitor having a first feedback terminal connected to a CTIA input of the CTIA and a second feedback terminal connected to the CTIA output.

14. The method of claim 13, further comprising generating the photocurrent in response to operating an image detector to selectively detect light having a first color and light having a second color different from the first color.

15. The method of claim 14, further comprising increasing a dynamic range of the image detector in response to delivering the second electrical charge to the CTIA.

16. The method of claim 15 further comprising:
generating a second voltage at a clamp node established by a connection between the first clamp terminal and a voltage source configured to generate the dynamic signal; and
selectively connecting or disconnecting a circuit path between the second clamp terminal and the voltage source to perform a correlated double sampling (CDS) operation such that charge noise is removed from the clamp node.

* * * * *